UNITED STATES PATENT OFFICE.

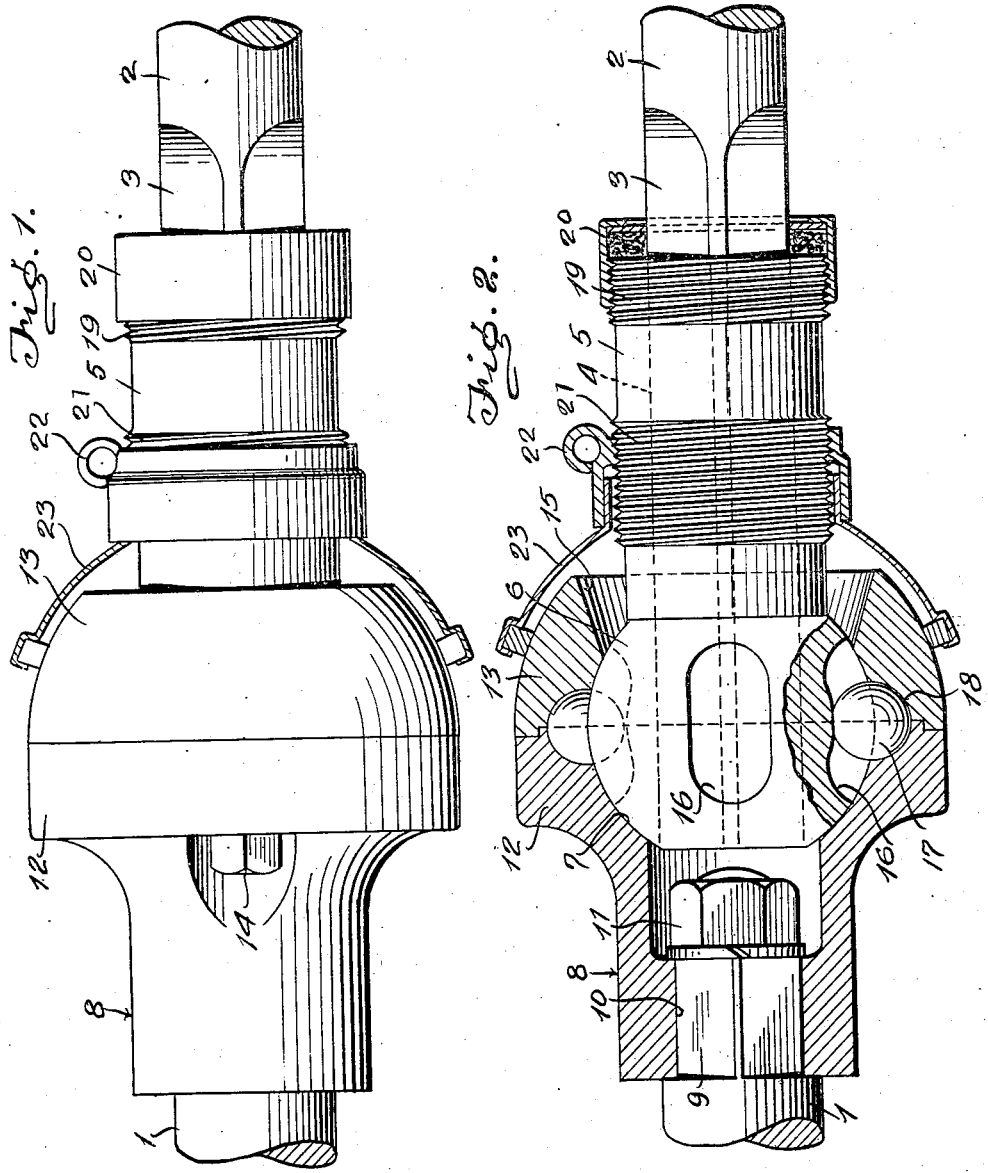

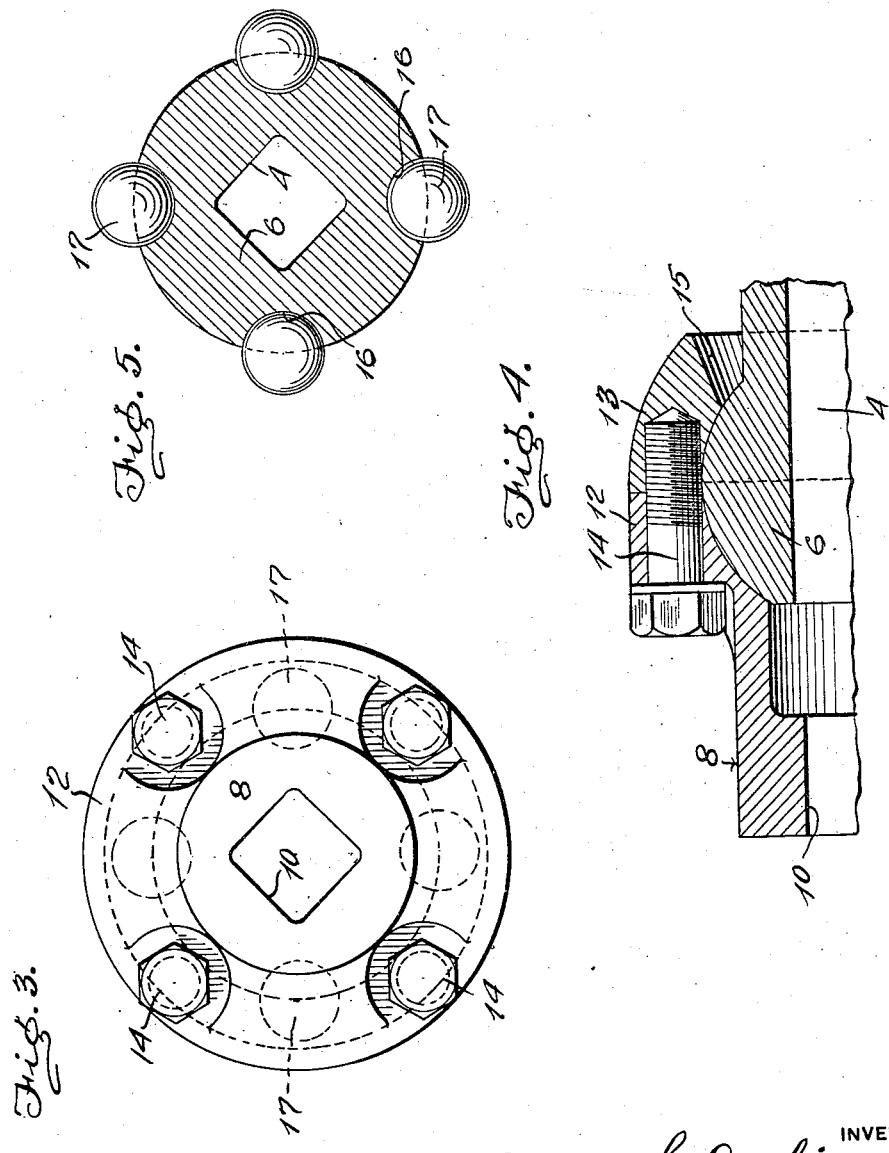

NORMAN G. DUNKINSON, OF YORK, PENNSYLVANIA.

UNIVERSAL JOINT.

1,305,259.     Specification of Letters Patent.     Patented June 3, 1919.

Application filed November 4, 1915. Serial No. 59,650.

*To all whom it may concern:*

Be it known that I, NORMAN G. DUNKINSON, citizen of the United States, residing at York, in the county of York and State of Pennsylvania, have invented certain new and useful Improvements in Universal Joints, of which the following is a specification.

My invention relates to machine elements and more especially to a universal joint of the ball and socket type.

Essentially, the invention may be said to consist of a sleeve; a grooved ball turned on one end thereof; an interiorly recessed socket member designed to inclose the said ball; and means fitting the recesses of the socket and the grooves of the ball to permit of relative movement of the thus joined parts.

In describing my invention in detail reference will be had to the accompanying drawings wherein like characters denote like or corresponding parts throughout the several views, and in which:

Figure 1 is an elevation of the joint;
Fig. 2 is a longitudinal sectional view;
Fig. 3 is an end view;
Fig. 4 is a longitudinal sectional view at an angle to that of Fig. 2; and
Fig. 5 is a cross section of the recessed ball.

Before proceeding with a description of the drawings, I desire to call particular attention to the fact that while I have evolved my invention with reference to its use as a motor vehicle accessory, the same, if desired, may be used upon tractors, engines, and in fact as an element of any and all machines wherein a universal joint is required.

Referring now to the drawings by numerals, 1 designates the power shaft and 2 the driven shaft, the latter having a polygonal end (in cross section) as indicated at 3 for fitting engagement with the bore 4 of a sleeve 5 carried thereby. A ball 6 is turned on one end of the sleeve 5 for fitting engagement in a socket 7 of a two-part socket member designated as an entirety by the numeral 8. A polygonal extension 9 is formed on the power shaft 1 to engage with a complemental opening 10 formed in the socket member 8 that the latter may turn or rotate therewith. A nut 11 is utilized as the means whereby said member 8 is locked to its associate shaft.

Socket member 8 in its preferred embodiment comprises connected sections 12 and 13; preferably shouldered or doweled together as shown in Fig. 2 to effectually centralize the ball end 6 of sleeve 5 so that any "whipping" action in the propeller or driven shaft 2 is prevented; the term shouldered here used is considered to include a construction in which a number of dowel pins are used, furthermore strains on the bolts 14 are reduced to a minimum as it will be seen that radial thrusts are taken up by the shoulder or dowel union of the two socket members. The shouldered construction of the two members 12 and 13 is specially advantageous in manufacturing where they are bolted and clamped together in a suitable fixture for the purpose of boring the ball recesses 18 by means of an inside tool passing through opening 15. When so constructed the lost motion in the joint is substantially nil. All of these features are important details in my universal joint. Screws 14 afford the connecting or fastening means. An opening 15 is formed in the section 13 of the socket member 8 that the sleeve 5 may extend therethrough, the said opening 15 being comparatively large, to provide space for the swiveling of sleeve 5 and shaft 2 and for the reception of lubricant as will be later referred to.

Grooves 16 are formed in the ball 6 of the socket 5 to afford a working space for ball bearings 17 partially seated in recesses 18 formed interiorly of the socket member 8. Sleeve 5 is exteriorly threaded as indicated at 19 for the reception of a packing nut 20, the mentioned nut confining the lubricant for the joint to the interior thereof. Said sleeve 5 is further provided with exterior threads 21 for the reception of a nut 22 adjustable thereon to move a dust protector 23 into and out of engagement with the outside surface of section 13 of socket member 8. In practice the nut 22 may be split longitudinally and threaded at the hole of the turned up portion and a screw passed through to clamp the nut 22 securely to the threads 21 of sleeve 5 thereby holding the dust protector in a fixed position.

In use, motion is transmitted to the power shaft 1, to the socket member 8, to ball bearings 17, to the sleeve 5, and to the driven shaft 2 in the order named. Ball bearings 17 by reason of their fitting engagement in the grooves 16 and the recesses 18 will permit oscillation of the sleeve 5 to a degree determined by the length of the grooves 16 and the size of the opening 15 through which said sleeve extends. It will be seen from the drawing Fig. 2 that the grooves 16 extend back on the ball 6 far enough to open into the conical shaped space 15, which is packed with grease before the protector 23 is put in place, and hence the grease will work into the grooves 16 and then over the surface of the ball 6, thereby keeping the whole exterior part of the joint lubricated. It will be readily understood that the hollow part of section 12 around nut 11 as well as the bore 4 in sleeve 5 forward of the shaft 2 may be packed with grease, it being understood that the shaft 2 does not extend the full length of the sleeve 5 as the shaft 2 must work back and forth therein. The packing nut 22 as mentioned above, serves to hold this lubricant in the space described. The ball bearings 17 act jointly to facilitate movement of the sleeve 5 relatively to the socket member 8 and in transmitting motion from said socket member to said sleeve.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a universal joint, the combination of two shafts connected together by ball and socket members each having the following instrumentalities; said socket member having two parts, divided in a plane transverse to said shafts, shouldered and bolted together to prevent whipping and having a plurality of recesses circumferentially arranged on the inner surfaces at the jointure of said parts; said ball member having an integral sleeve with a polygonal bore extending from end to end, and a shaft having a polygonal shaped end adapted for reciprocation with the bore forming a slidable connection, said ball having a plurality of longitudinal grooves circumferentially arranged thereon, and circular members carried by said grooves and recesses for driving purposes.

2. In a universal joint, the combination of a driving shaft terminating in a socket member having two parts shouldered and bolted together and having a plurality of ball recesses, the outer part of said socket member having a conical shaped rearwardly extending opening, a driven shaft slidably terminating in a hollow sleeve adapted to swivel in said conical opening and having a ball on one end constructed to fit in the socket member, a protector cap carried on said sleeve inclosing said conical opening and serving to retain lubricant therewithin, said ball on the sleeve having a plurality of grooves extending rearwardly into said conical opening to permit lubricant to work forward into the said grooves and ball recesses and thence over the surfaces of the socket and ball members, and balls carried in said grooves and recesses for forming a driving and swivel connection between the ball and socket members.

3. In a universal joint, the combination of a socket member having two parts shouldered and bolted directly together and having a plurality of recesses and an integral ball and sleeve member having a through polygonal bore adapted to carry lubricant in the ball end; a driving shaft having a polygonal shaped end adapted to fit a complemental opening in one of said socket parts, said socket part having a chamber with means therein for locking said part to the driving shaft, said chamber also adapted to hold a quantity of lubricant, the other of said socket parts having a conical shaped rearwardly extending opening; a driven shaft having an end formed to fit and slide in the bore of said ball and sleeve member, a protector cap carried on said sleeve and inclosing said conical opening and serving to retain lubricant therewithin, said ball on the sleeve having a plurality of grooves extending rearwardly normally into said conical opening to permit lubricant to work forward into said grooves and recesses and thence over the surfaces of the ball and socket members, said driven shaft in its operation back and forth being adapted to move the lubricant in said bore, as well as to draw lubricant from said chamber in the socket member into and over the whole surfaces of the hollow portion of the ball and sleeve member, a packing nut on the end of the sleeve for holding the lubricant therewithin and members carried by said recesses and grooves for forming a driving and swivel connection between the ball and socket members.

4. In a universal joint, a power shaft terminating in a socket member, a driven shaft terminating in a ball for complemental engagement with said socket member, circular members mounted in said socket member for engagement with said ball to transmit power and motion from one to the other, said socket member being divided into two parts in a plane transverse to said shaft, said parts being shouldered and bolted together for the purpose described.

5. In a universal joint, a socket member divided in two parts in a plane transverse to its axis so as to form a shouldered union, bolts for holding the two parts together, one of said parts having a conical shaped opening at its end opposite the shouldered end, said socket parts having recesses on opposite sides of said plane and adapted to be made by mechanism entering said conical shaped opening; a sleeve member having a ball on its end to coöperate with said socket member, said ball having grooves therein and circular driving members in said grooves and recesses to transmit motion from one member to the other.

In testimony whereof I affix my signature in presence of two witnesses.

NORMAN G. DUNKINSON.

Witnesses:
R. E. TROUT,
G. C. RAUHAUSER.